United States Patent
Rosén

(10) Patent No.: US 11,118,790 B2
(45) Date of Patent: Sep. 14, 2021

(54) THERMAL SERVER PLANT AND A METHOD FOR CONTROLLING THE SAME

(71) Applicant: E.ON Sverige AB, Malmö (SE)

(72) Inventor: Per Rosén, Lund (SE)

(73) Assignee: E. ON SVERIGE AB, Malmö (SE)

( * ) Notice: Subject to any disclaimer, the term of this patent is extended or adjusted under 35 U.S.C. 154(b) by 520 days.

(21) Appl. No.: 16/064,908

(22) PCT Filed: Dec. 15, 2016

(86) PCT No.: PCT/EP2016/081137
§ 371 (c)(1),
(2) Date: Jun. 21, 2018

(87) PCT Pub. No.: WO2017/108561
PCT Pub. Date: Jun. 29, 2017

(65) Prior Publication Data
US 2019/0011136 A1    Jan. 10, 2019

(30) Foreign Application Priority Data
Dec. 21, 2015 (EP) .................................... 15201659

(51) Int. Cl.
*F24D 19/10* (2006.01)
*F24D 10/00* (2006.01)
*F24D 11/00* (2006.01)

(52) U.S. Cl.
CPC ....... *F24D 19/1069* (2013.01); *F24D 10/003* (2013.01); *F24D 11/00* (2013.01); *Y02B 30/17* (2018.05); *Y02E 20/14* (2013.01)

(58) Field of Classification Search
USPC ......................................................... 237/8 A
See application file for complete search history.

(56) References Cited

U.S. PATENT DOCUMENTS

2004/0153280 A1* 8/2004 Lindgren ................ F28F 27/02
702/130
2012/0279681 A1* 11/2012 Vaughan ............... F24D 10/003
165/62

FOREIGN PATENT DOCUMENTS

DE        31 23 875 A1    3/1982
DE        198 10 416 A1   9/1998
(Continued)

OTHER PUBLICATIONS

English language translation of Russian Decision on Granting dated May 25, 2020 in Russian Application No. 2018119661.
(Continued)

*Primary Examiner* — Kenneth J Hansen
*Assistant Examiner* — John E Bargero
(74) *Attorney, Agent, or Firm* — Xsensus LLP

(57) ABSTRACT

The present invention relates to a thermal server plant (40) arranged to be connected to a thermal energy circuit (10) comprising a hot conduit (12) configured to allow heat transfer liquid of a first temperature to flow therethrough, and a cold conduit (14) configured to allow heat transfer liquid of a second temperature to flow therethrough. The thermal server plant comprises a balancing device (41) arranged to be connected to the hot conduit and to the cold conduit for selectively allowing heat transfer liquid to flow from the hot conduit, via a regulator (42) and a heat exchanger (44), into the cold conduit or allowing heat transfer liquid to flow from the cold conduit, via the regulator and the heat exchanger, into the hot conduit. The flow direction is determined by a pressure difference between the hot and cold conduits. The heat exchanger is configured to alter the temperature of the heat transfer liquid flowing through the balancing device by selectively cool heat trans- (Continued)

fer liquid from the hot conduit or heat transfer liquid from the cold conduit.

17 Claims, 5 Drawing Sheets

(56) References Cited

FOREIGN PATENT DOCUMENTS

| DE | 19810416 A1 | * | 9/1998 | ........... F24D 10/003 |
|----|----|----|----|----|
| EP | 2685174 A1 | * | 1/2014 | ........... F24D 10/003 |
| RU | 101 532 U1 | | 1/2011 | |
| RU | 2 527 186 C1 | | 8/2014 | |
| WO | 99/54665 A1 | | 10/1999 | |
| WO | 2010/145040 A1 | | 12/2010 | |

OTHER PUBLICATIONS

International Search Report and Written Opinion for PCT/EP2016/081137 dated Mar. 29, 2017.

* cited by examiner

THERMAL SERVER PLANT AND A METHOD FOR CONTROLLING THE SAME

FIELD OF THE INVENTION

The invention relates to thermal server plant to be connected to a thermal energy circuit comprising a hot and a cold conduit.

BACKGROUND OF THE INVENTION

Nearly all large developed cities in the world have at least two types of energy grids incorporated in their infrastructures; one grid for providing electrical energy and one grid for providing space heating and hot tap water preparation. Today a common grid used for providing space heating and hot tap water preparation is a gas grid providing a burnable gas, typically a fossil fuel gas. The gas provided by the gas grid is locally burned for providing space heating and hot tap water. An alternative for the gas grid for providing space heating and hot tap water preparation is a district heating grid. Also the electrical energy of the electrical energy grid may be used for space heating and hot tap water preparation. Also the electrical energy of the electrical energy grid may be used for space cooling. The electrical energy of the electrical energy grid is further used for driving refrigerators and freezers.

Accordingly, traditional building heating and cooling systems use primary high grade energy sources such as electricity and fossil fuels or an energy source in the form of industrial waste heat to provide space heating and/or cooling, and to heat or cool water used in the building. Furthermore, it has been increasingly common to also install a district cooling grid in cities for space cooling. The process of heating or cooling the building spaces and water converts this high grade energy into low grade waste heat with high entropy which leaves the building and is returned to the environment.

Hence, there is a need for improvements in how to provide heating and cooling to a city.

SUMMARY OF THE INVENTION

It is an object of the present invention to solve at least some of the problems mentioned above.

According to a first aspect a thermal server plant is provided. The thermal server plant is arranged to be connected to a thermal energy circuit comprising a hot conduit configured to allow heat transfer liquid of a first temperature to flow therethrough, and a cold conduit configured to allow heat transfer liquid of a second temperature to flow therethrough, the second temperature is lower than the first temperature. The thermal server plant comprises a balancing device arranged to be connected to the hot conduit and to the cold conduit for selectively allowing heat transfer liquid to flow from the hot conduit, via a regulator and a heat exchanger of the balancing device, into the cold conduit or allowing heat transfer liquid to flow from the cold conduit, via the regulator and the heat exchanger, into the hot conduit, wherein the regulator is configured to regulate the flow of heat transfer liquid between the hot and cold conduits through the balancing device, and wherein the heat exchanger is configured to alter the temperature of the heat transfer liquid flowing through the balancing device by selectively cool heat transfer liquid from the hot conduit or heat heat transfer liquid from the cold conduit. The thermal server plant further comprises a pressure difference determining device adapted to determine a local pressure difference, $\Delta p_{local}$, between a hot conduit local pressure, $p_h$, of heat transfer liquid of the hot conduit and a cold conduit local pressure, $p_c$, of heat transfer liquid of the cold conduit, $\Delta p_{local} = p_h - p_c$, wherein the regulator is configured to, based on the local pressure difference, regulate the flow of heat transfer liquid between the hot and cold conduits.

Accordingly a simple and easy to handle thermal server plant for maintaining the temperature difference between the hot and cold conduits of the thermal energy circuit is provided.

The regulator may be configured to: upon the local pressure difference, $\Delta p_{local}$, is determined to be above a first differential pressure threshold, regulate the flow of heat transfer liquid from the hot conduit to the cold conduit; or upon the local pressure difference, $\Delta p_{local}$, is determined to be below a second differential pressure threshold, regulate the flow of heat transfer liquid from the cold conduit to the hot conduit, wherein the second differential pressure threshold is lower than or equal to the first differential pressure threshold.

The heat exchanger may be configured to cool heat transfer liquid from the hot conduit with a predetermined differential cooling temperature or to heat transfer liquid from the cold conduit with a predetermined differential heating temperature.

The temperature difference between the first and second temperatures may be in the range of 5-16° C., preferably in the range of 7-12° C., more preferably 8-10° C.

The predetermined differential cooling temperature may be within the temperature difference range according to above. The predetermined differential heating temperature may be within the temperature difference range according to the above.

The pressure difference determining device may comprise a hot conduit pressure determining unit and a cold conduit pressure determining unit, wherein the hot conduit pressure determining unit is arranged to be connected to the hot conduit for measuring the hot conduit local pressure, and wherein the cold conduit pressure determining unit is arranged to be connected to the cold conduit for measuring the cold conduit local pressure.

The hot conduit pressure determining unit is connected to the hot conduit in the vicinity to where the balancing device is connected to the hot conduit, and wherein the cold conduit pressure determining unit is connected to the cold conduit in the vicinity to where the balancing device is connected to the cold conduit.

The thermal server plant may further comprise a controller connected to the pressure difference determining device and the heat exchanger, wherein the controller is configured to: upon the local pressure difference, $\Delta p_{local}$, is determined to be above the first differential pressure threshold, control the heat exchanger such that the heat transfer liquid flowing through the balancing device is cooled; or upon the local pressure difference, $\Delta p_{local}$, is determined to be below the second differential pressure threshold, control the heat exchanger such that the heat transfer liquid flowing through the balancing device is heated.

The controller may further be connected to the regulator for controlling the regulator.

The thermal server plant may further comprise a thermal energy accumulator external from the thermal energy circuit, wherein the heat exchanger is connected to the thermal energy accumulator, wherein the heat exchanger is configured to extract thermal energy from the thermal energy accumulator upon heating of heat transfer liquid, and wherein the heat exchanger is configured to deposit thermal energy to the thermal energy accumulator upon cooling of heat transfer liquid.

According to a second aspect a method for controlling thermal energy of the thermal energy circuit is provided. The method comprises: determining a local pressure difference, $\Delta p_{local}$, between a hot conduit local pressure, $p_h$, of heat transfer liquid of the hot conduit and a cold conduit local pressure, $p_c$, of heat transfer liquid of the cold conduit, $\Delta p_{local} = p_h - p_c$; regulating, based on the local pressure difference, a flow direction of heat transfer liquid between the hot and cold conduits, thereby selectively allowing heat transfer liquid to flow from the hot conduit, via a regulator and a heat exchanger, into the cold conduit or allowing heat transfer liquid to flow from the cold conduit, via the regulator and the heat exchanger, into the hot conduit; upon heat transfer liquid is regulated to flow from the hot conduit through the heat exchanger, cooling the heat transfer liquid by the heat exchanger; upon heat transfer liquid is regulated to flow from the cold conduit through the heat exchanger heating the heat transfer liquid by the heat exchanger.

Upon the local pressure difference, $\Delta p_{local}$, is determined to be above a first differential pressure threshold, the act of regulating may comprise regulating the flow direction of heat transfer liquid such that heat transfer liquid is flowing from the hot conduit, via the regulator and the heat exchanger, into the cold conduit. Upon the local pressure difference, $\Delta p_{local}$, is determined to be below a second differential pressure threshold, the act of regulating may comprise regulating the flow direction of heat transfer liquid such that heat transfer liquid is flowing from the cold conduit, via the regulator and the heat exchanger, into the hot conduit. The second differential pressure threshold is lower than or equal to the first differential pressure threshold.

The act of cooling heat transfer liquid by the heat exchanger may comprises cooling heat transfer liquid with a predetermined differential cooling temperature, wherein the predetermined differential cooling temperature is in the range of 5-16° C., preferably in the range of 7-12° C., more preferably 8-10° C. The act of heating heat transfer liquid by the heat exchanger may comprise heating heat transfer liquid with a predetermined differential heating temperature, wherein the predetermined differential heating temperature is in the range of 5-16° C., preferably in the range of 7-12° C., more preferably 8-10° C.

The act of cooling heat transfer liquid by the heat exchanger may comprise depositing thermal energy to a thermal energy accumulator. The act of heating heat transfer liquid by the heat exchanger may comprise extracting thermal energy from the thermal energy accumulator.

The above mentioned features of the thermal server plant, when applicable, apply to this second aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting.

It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
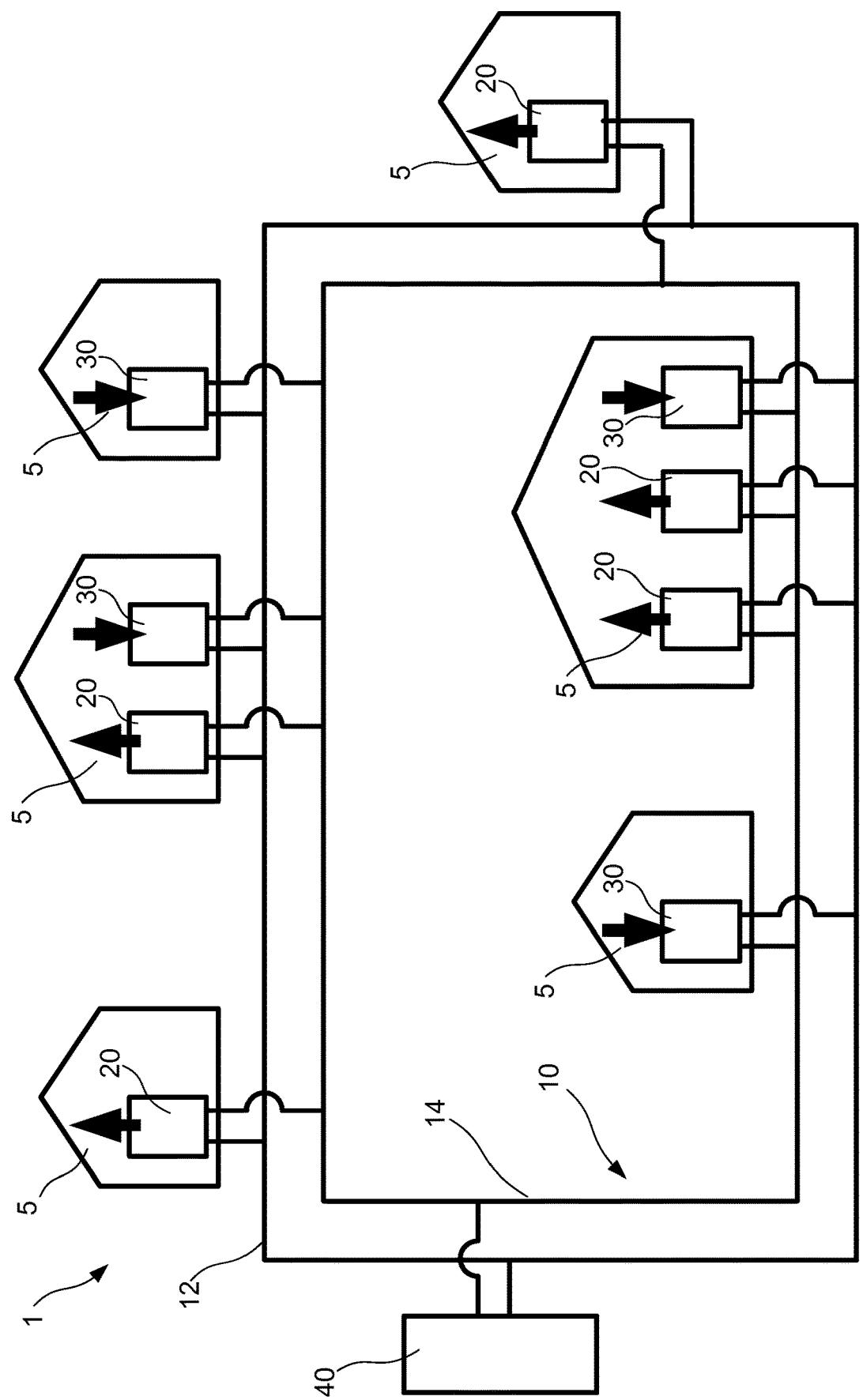
FIG. 1 is a schematic diagram of a district thermal energy distribution system.

In FIG. 1 a district thermal energy distribution system 1 is illustrated. The district thermal energy distribution system 1 comprises a thermal energy circuit 10 and a plurality of buildings 5. The plurality of buildings 5 are thermally coupled to the thermal energy circuit 10. The thermal energy circuit 10 is arranged to circulate and store thermal energy in heat transfer liquid flowing through the thermal energy circuit 10.

According to one embodiment the heat transfer liquid comprises water. However, according to other embodiments other heat transfer liquid may be used. Some non-limiting examples are ammonia, oils, alcohols and anti-freezing liquids such as glycol. The heat transfer liquid may also comprise a mixture of two or more of the heat transfer liquids mentioned above.

The thermal energy circuit 10 comprises two conduits 12, 14 for allowing flow of heat transfer liquid therethrough. The temperature of the heat transfer liquid of the two conduits 12, 14 is set to be different. A hot conduit 12 in the thermal energy circuit 10 is configured to allow heat transfer liquid of a first temperature to flow therethrough. A cold conduit 14 in the thermal energy circuit 10 is configured to allow heat transfer liquid of a second temperature to flow therethrough. The second temperature is lower than the first temperature.

In case heat transfer liquid is water, a suitable normal operation hot temperature range for heat transfer liquid in the hot conduit 12 is between 5 and 45° C. and a suitable normal operation cold temperature range for heat transfer liquid in the cold conduit 14 is between 0 and 40° C. A suitable temperature difference between the first and second temperatures is in the range of 5-16° C., preferably in the range of 7-12° C., more preferably 8-10° C.

Preferably, the system is set to operate with a sliding temperature difference which varies depending on the climate. Preferably, the sliding temperature difference is fixed. Hence, the temperature difference is always set to momentarily slide with a fixed temperature difference.

The hot conduit 12 and the cool conduit 14 are separate. The hot conduit 12 and the cool conduit 14 may be parallel arranged. The hot conduit 12 and the cool conduit 14 may be arranged as closed loops of piping. The hot conduit 12 and the cool conduit 14 are fluidly interconnected at the buildings 5 for allowing of thermal energy transfer to and from the buildings 5.

The two conduits 12, 14 of the thermal energy circuit 10 may be formed by plastic, composite, concrete, or metal pipes. According to one embodiment High Density Polyethylene (HDPE) pipes may be used. The pipes may be single wall pipes. The pipes may be un-insulated. According to one embodiment the thermal energy circuit 10 is mainly arranged in the ground. The ground will be used as thermal inertia of the thermal energy circuit 10. Hence, insulation of the piping gives no extra value. Exceptions are installation in cities with a very warm climate or cities with very cold climate. Here the inertia of the ground may be more harmful than good during critical parts of the year. Here insulation of the piping may be needed.

According to one embodiment the two conduits 12, 14 of the thermal energy circuit 10 are dimensioned for pressures up to 1 MPa (10 bar). According to other embodiments the two conduits 12, 14 of the thermal energy circuit 10 may be dimensioned for pressures up to 0.6 MPa (6 bar) or for pressures up to 1.6 MPa (16 bar).

Each building 5 comprise at least one of one or more local thermal energy consumer assemblies 20 and one or more local thermal energy generator assemblies 30. Hence, each building comprises at least one local thermal energy consumer assembly 20 or at least one local thermal energy generator assembly 30. One specific building 5 may comprise more than one local thermal energy consumer assembly 20. One specific building 5 may comprise more than one local thermal energy generator assembly 30. One specific building 5 may comprise both a local thermal energy consumer assembly 20 and a local thermal energy generator assembly 30.

The local thermal energy consumer assembly 20 is acting as a thermal sink. Hence, the local thermal energy consumer assembly 20 is arranged to remove thermal energy from the thermal energy circuit 10. Or in other words, the local thermal energy consumer assembly 20 is arranged to transfer thermal energy from heat transfer liquid of the thermal energy circuit 10 to surroundings of the local thermal energy consumer assembly 20. This is achieved by transfer thermal energy from heat transfer liquid taken from the hot conduit 12 to surroundings of the local thermal energy consumer assembly 20, such that heat transfer liquid returned to the cold conduit 14 has a temperature lower than the first temperature and preferably a temperature equal to the second temperature.

The local thermal energy generator assembly 30 is acting as a thermal source. Hence, the local thermal energy generator assembly 30 is arranged to deposit thermal energy to the thermal energy circuit 10. Or in other words, the local thermal energy generator assembly 30 is arranged to transfer thermal energy from its surroundings to heat transfer liquid of the thermal energy circuit 10. This is achieved by transfer thermal energy from surroundings of the local thermal energy generator assembly 30 to heat transfer liquid taken from the cold conduit 12, such that heat transfer liquid returned to the hot conduit 12 has a temperature higher than the second temperature and preferably a temperature equal to the first temperature.

The one or more local thermal energy consumer assemblies 20 may be installed in the buildings 5 as local heaters for different heating needs. As a non-limiting example, a local heater may be arranged to deliver space heating or hot tap hot water preparation. Alternatively or in combination, the local heater may deliver pool heating or ice- and snow purging. Hence, the local thermal energy consumer assembly 20 is arranged for deriving heat from heat transfer liquid of the hot conduit 12 and creates a cooled heat transfer liquid flow into the cold conduit 14. Hence, the local thermal energy consumer assembly 20 fluidly interconnects the hot and cool conduits 12, 14 such that hot heat transfer liquid can flow from the hot conduit 12 through the local thermal energy consumer assembly 20 and then into the cool conduit 14 after thermal energy in the heat transfer liquid has been consumed by the local thermal energy consumer assembly 20. The local thermal energy consumer assembly 20 operates to draw thermal energy from the hot conduit 12 to heat the building 5 and then deposits the cooled heat transfer liquid into the cool conduit 14.

The one or more local thermal energy generator assemblies 30 may be installed in different buildings 5 as local coolers for different cooling needs. As an on-limiting example a local cooler may be arranged to deliver space cooling or cooling for freezers and refrigerators. Alternatively or in combination, the local cooler may deliver cooling for ice rinks and ski centers or ice- and snow making. Hence, the local thermal energy generator assembly 30 is deriving cooling from heat transfer liquid of the cold conduit 14 and creates a heated heat transfer liquid flow into the hot conduit 12. Hence, the local thermal energy generator assembly 30 fluidly interconnects the cold and hot conduits 14, 12 such that cold heat transfer liquid can flow from the cold conduit 14 through the local thermal energy generator assembly 30 and then into the hot conduit 12 after thermal energy has been generated into the heat transfer liquid by the local thermal energy generator assembly 30. The local thermal energy generator assembly 30 operates to extract heat from the building 5 to cool the building 5 and deposits that extracted heat into the hot conduit 12.

The local thermal energy consumer assembly 20 is selectively connected to the hot conduit 12 via a valve and a pump. Upon selecting the connection of the local thermal energy consumer assembly 20 to the hot conduit 12 to be via the valve, heat transfer liquid from the hot conduit 12 is allowed to flow into the local thermal energy consumer assembly 20. Upon selecting the connection of the local thermal energy consumer assembly 20 to the hot conduit 12 to be via the pump, heat transfer liquid from the hot conduit 12 is pumped into the local thermal energy consumer assembly 20.

The local thermal energy generator assembly 30 is selectively connected to the cold conduit 14 via a valve and a pump. Upon selecting the connection of the local thermal energy generator assembly 30 to the cold conduit 14 to be via the valve, heat transfer liquid from the cold conduit 14 is allowed to flow into the local thermal energy generator assembly 30. Upon selecting the connection of the local thermal energy generator assembly 30 to the cold conduit 14 to be via the pump, heat transfer liquid from the cold conduit 14 is pumped into the local thermal energy generator assembly 30.

Preferably, the demand to inhale or exhale thermal energy using the local thermal energy consumer assemblies 20 and the local thermal energy generator assemblies 30 is made at a defined temperature difference. A temperature difference in the range of 5-16° C., preferably in the range of 7-12° C., more preferably 8-10° C. corresponds to optimal flows through the system.

The local pressure difference between the hot and cold conduits 12, 14 may vary along the thermal energy circuit 10. Especially, the local pressure difference between the hot and cold conduits 12, 14 may vary from positive to negative pressure difference seen from one of the hot and cold conduits 12, 14. Hence, sometimes a specific local thermal energy consumer/generator assembly 20, 30 may need to pump heat transfer liquid there through and sometimes the specific local thermal energy consumer/generator assembly 20, 20 may need to let heat transfer liquid flow through there through. Accordingly, it will be possible to let all the pumping within the system 1 to take place in the local thermal energy consumer/generator assemblies 20, 30. Due to the limited flows and pressures needed small frequency controlled circulation pumps may be used.

The district thermal energy distribution system 1 allow for the local pressure difference between heat transfer liquid of the hot and cold conduits 12, 14 to vary along the thermal energy circuit 10. Especially, the local pressure difference between heat transfer liquid of the hot and cold conduits 12, 14 may vary from positive to negative pressure difference seen from one of the hot and cold conduits 12, 14. The district thermal energy distribution system 1 further allow for the possibility to let all the pumping within the system to take place in the local thermal energy consumer/generator assemblies 20, 30. Due to the limited flows and pressures needed small frequency controlled circulation pumps may be used. Hence, an easy to build district thermal energy distribution system 1 is provided. Further a district thermal energy distribution system 1 that is easy to control is provided.

The basic idea of the district thermal energy distribution system 1 is based on the insight by the inventors that modern day cities by them self provide thermal energy that may be reused within the city. The reused thermal energy may be picked up by the district thermal energy distribution system 1 and be used for e.g. space heating or hot tap water preparation. Moreover, increasing demand for space cooling will also be handled within the district thermal energy distribution system 1. Within the district thermal energy distribution system 1 buildings 5 within the city are interconnected and may in an easy and simple way redistribute low temperature waste energy for different local demands. Amongst other the district thermal energy distribution system will provide for:

Minimizing the use of primary energy due to optimal re-use of energy flows inside the city.

Limiting the need for chimneys or firing places inside the city, since the need for locally burning gas or other fuels will be reduced.

Limiting the need for cooling towers or cooling convectors inside the city, since excess heat produced by cooling devices may be transported away and reused within the district thermal energy distribution system 1.

Hence, the district thermal energy distribution system 1 provide for a smart duel use of thermal energy within a city. When integrated into a city the district thermal energy distribution system 1 make use of low level thermal energy waste in both heating and cooling applications within the city. This will reduce the primary energy consumption of a city by eliminating the need for a gas grid or a district heating grid and a cooling grid in city.

In order to balance the thermal energy within the district thermal energy distribution system 1, the system 1 further comprises a thermal server plant 40. The thermal server plant 40 functions as an external thermal source and/or thermal sink. The function of the thermal server plant 40 is to maintain the temperature difference between the hot and cold conduits 12, 14 of the thermal energy circuit 10. The function of the thermal server plant 40 is further to regulate the pressure difference between the hot and cold conduits 12, 14 of the thermal energy circuit 10.

As mentioned above, within the district thermal energy distribution system 1 the pumping of the heat transfer liquid take place in the local thermal energy consumer/generator assemblies 20, 30. Hence, there is no need for central pumping, e.g. at the thermal server plant 40. A consequence of the design of the district thermal energy distribution system 1 the overall pressure within the hot conduit 12 will increase if there is excess of heat in the system 1. For the same reason the overall pressure within the cold conduit 14 will increase if there is deficit of heat in the system 1.

The thermal server plant 40 is configured to regulate a flow of heat transfer liquid between the hot and cold conduits 12, 14 such that a predetermined differential pressure between the hot and cold conduits 12, 14 is kept. Hence, in case pressure increases in the hot conduit 12, due to excess of heat in the system 1, the thermal server plant 40 is configured to regulate the flow of heat transfer liquid from the hot conduit 12 into the cold conduit 14. Further, in case pressure increases in the cold conduit 14, due to deficit of heat in the system 1, the thermal server plant 40 is configured to regulate the flow of heat transfer liquid from the cold conduit 14 into the hot conduit 12. Moreover, the thermal server plant 40 is configured to alter the temperature of the heat transfer liquid flowing between the hot and cold conduits 12, 14. Especially, the thermal server plant 40 is configured to cool heat transfer liquid flowing from the hot conduit 12 via the thermal server plant 40 into the cold conduit 14 and to heat heat transfer liquid flowing from the cold conduit 14 via the thermal server plant 40 into the hot conduit 12.

Figure 2A:
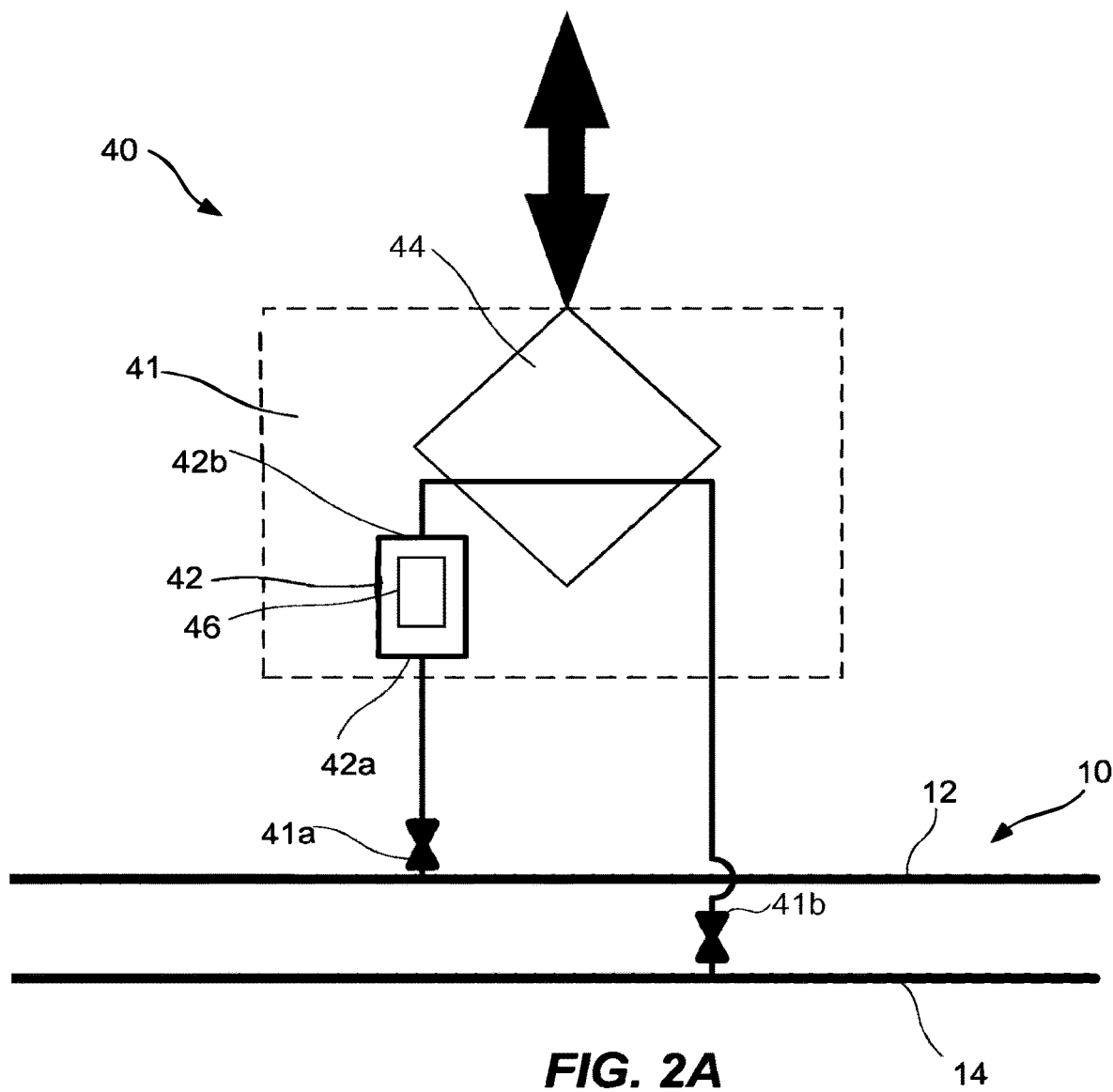
FIG. 2A is a schematic diagram of a thermal server plant connected to a thermal energy circuit.
Figure 2B:
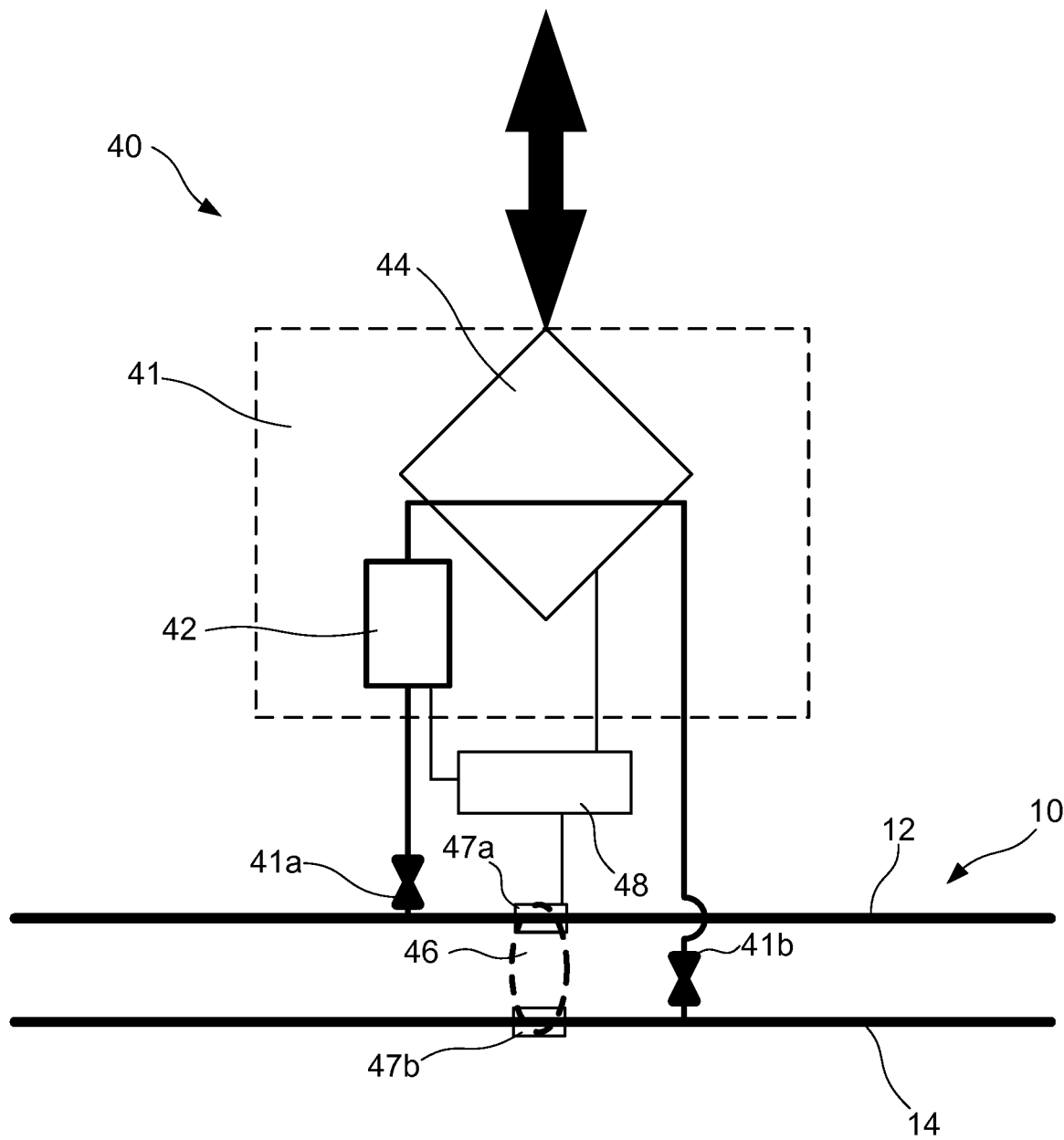
FIG. 2B is a schematic diagram of an alternative thermal server plant connected to the thermal energy circuit.
Figure 3:
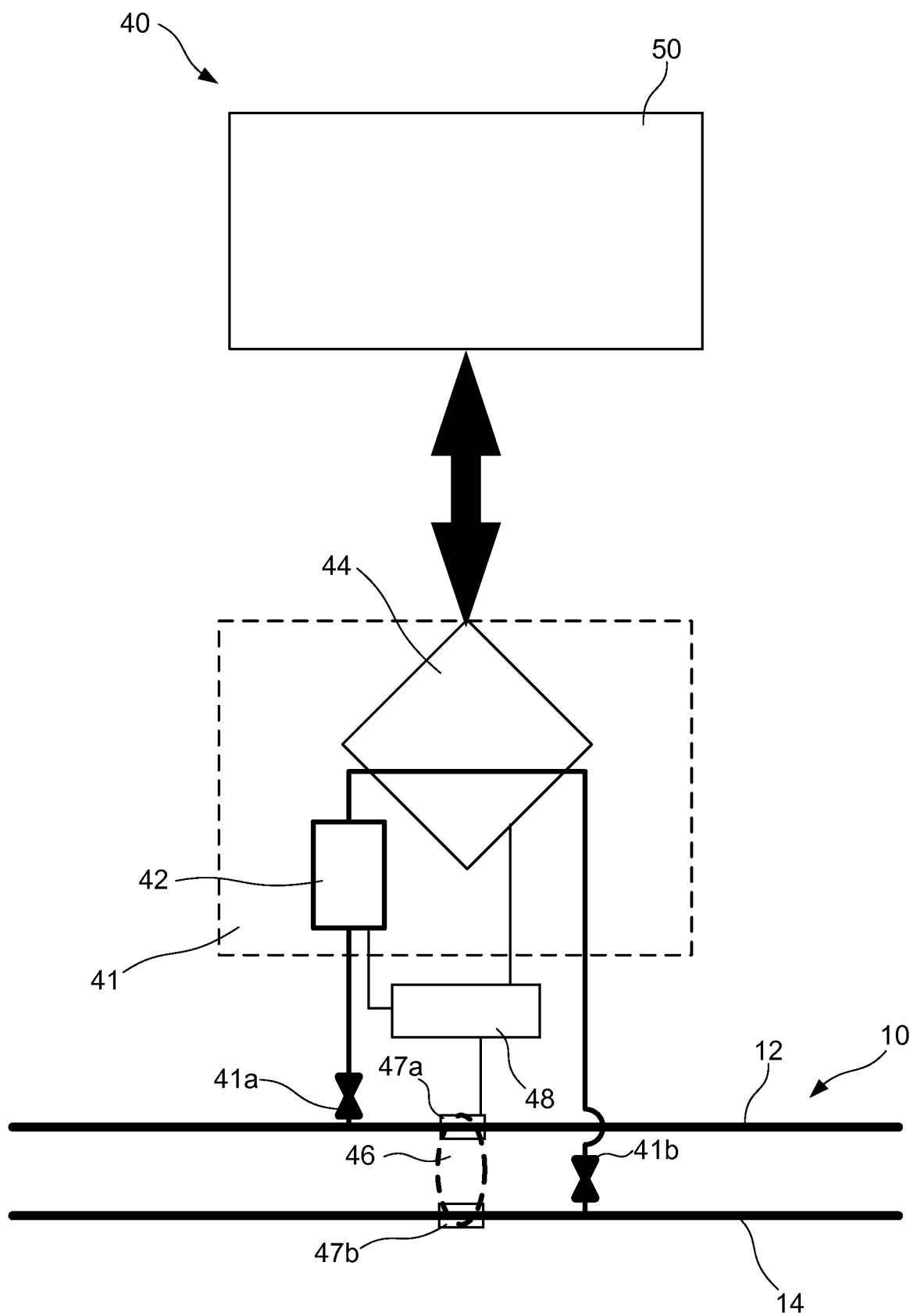
FIG. 3 is a schematic diagram of yet an alternative thermal server plant connected to the thermal energy circuit.

With reference to FIGS. 2A, 2B and 3 some embodiments of the thermal server plant 40 will be discussed.

The thermal server plant 40 comprises a balancing device 41 and a pressure difference determining device 46.

The balancing device 41 comprises a regulator 42 and a heat exchanger 44. The balancing device 41 is arranged to be connected to the hot conduit 12 and to the cold conduit 14. The balancing device 41 is arranged for selectively allowing heat transfer liquid to flow from the hot conduit 12, via the regulator 42 and the heat exchanger 44, into the cold conduit 14 or allowing heat transfer liquid to flow from the cold conduit 14, via the regulator 42 and the heat exchanger 44, into the hot conduit 12.

The regulator 42 is configured to regulate the flow of heat transfer liquid between the hot and cold conduits 12, 14 through the balancing device 41. The regulator 42 is configured to regulate the flow of heat transfer liquid between the hot and cold conduits 12, 14 based on a local pressure difference between the hot and cold circuits 12, 14. Upon the local pressure difference, $\Delta p_{local}$, is above a first differential pressure threshold, the regulator 42 is configured to regulate the flow of heat transfer liquid from the hot conduit 12 to the cold conduit 14. Upon the local pressure difference, $\Delta p_{local}$, is below a second differential pressure threshold, the regulator 42 is configured to regulate the flow of heat transfer liquid from the cold conduit 14 to the hot conduit 12. The second differential pressure threshold is lower than or equal to the first differential pressure threshold. The local pressure difference is determined by the pressure difference determining device 46. The pressure difference determining device 46 will be discussed in more detail below. The regulator 42 may as in the in FIGS. 2A, 2B and 3 shown exemplified embodiments be arranged between the connection of the balancing unit 41 to the hot conduit 12 and the heat exchanger 44. Alternatively, the regulator 42 may be arranged between the connection of the balancing unit 41 to the cold conduit 14 and the heat exchanger 44. Yet alternatively, the balancing unit 41 may have a pair of cooperating regulators 42 one of the pair being arranged between the connection of the balancing unit 41 to the cold conduit 14 and the heat exchanger 44 and the other of the pair being arranged between the connection of the balancing unit 41 to the hot conduit 12 and the heat exchanger 44.

The heat exchanger 44 is configured to alter the temperature of the heat transfer liquid flowing through the balancing device 41 by selectively cool heat transfer liquid from the hot conduit 12 or heat heat transfer liquid from the cold conduit 14. The heat exchanger 44 is configured to cool heat transfer liquid from the hot conduit 12 with a predetermined differential cooling temperature. The predetermined differential cooling temperature is in the range of 5-16° C., preferably in the range of 7-12° C., more preferably 8-10° C. The heat exchanger 44 is further configured to heat transfer liquid from the cold conduit 14 with a predetermined differential heating temperature. The predetermined differential heating temperature is in the range of 5-16° C., preferably in the range of 7-12° C., more preferably 8-10° C. The heat exchanger may comprise a flow direction determining unit (not shown) configured to determine the flow direction for the heat transfer liquid flowing through the heat exchanger 4. The selection of cooling or heating of heat transfer liquid flowing through the heat exchanger 44 may be based on data from the flow direction determining unit.

The pressure difference determining device 46 is adapted to determine the local pressure difference, $\Delta p_{local}$, as pressure difference between a hot conduit local pressure, $p_h$, of heat transfer liquid of the hot conduit and a cold conduit local pressure, $p_c$, of heat transfer liquid of the cold conduit. Hence, $\Delta p_{local} = p_h - p_c$. The pressure difference determining device 46 may be embodied in many different ways. Below some exemplified embodiments of the pressure difference determining device 46 will be discussed.

The pressure difference determining device 46 may, as in the in FIG. 2A shown embodiment, be integrated in the regulator 42. An example of such an integrated regulator 42 and pressure difference determining device 46 is a differential pressure regulator. Upon the pressure difference between the local pressure of heat transfer liquid at the hot conduit end 42a of the differential pressure regulator and the local pressure of the heat transfer liquid on the cold conduit end 42b of the differential pressure regulator being above the first differential pressure threshold, the differential pressure regulator is arranged to regulate the flow of heat transfer liquid from the hot conduit 12 to the cold conduit 14. Upon the pressure difference between the local pressure of heat transfer liquid at the hot conduit end 42a of the differential pressure regulator and the local pressure of the heat transfer liquid on the cold conduit end 42b of the differential pressure regulator being below the second differential pressure threshold, the differential pressure regulator is arranged to regulate the flow of heat transfer liquid from the cold conduit 14 to the hot conduit 12.

Alternatively or in combination, the pressure difference determining device 46 may, as in the in FIGS. 2B and 3 shown embodiments, be an independent device. According to these exemplified embodiments the pressure difference determining device 46 is configured to determine a hot conduit local pressure, $p_h$, of heat transfer liquid of the hot conduit 12 and a cold conduit local pressure, $p_c$, of heat transfer liquid of the cold conduit 14. The local pressure difference, $\Delta p_{local}$, is then determined as $\Delta p_{local} = p_h - p_c$. The pressure difference determining device 46 may comprise a hot conduit pressure determining unit 47a and a cold conduit pressure determining unit 47b. The hot conduit pressure determining unit 47a is arranged to be connected to the hot conduit 12 for measuring the hot conduit local pressure, $p_h$. The cold conduit pressure determining unit 47b is arranged to be connected to the cold conduit 14 for measuring the cold conduit local pressure, $p_c$. The hot conduit pressure determining unit 47a is preferably connected to the hot conduit 12 in the vicinity to where the balancing device 41 is connected to the hot conduit 12. The cold conduit pressure determining unit 47b is preferably connected to the cold conduit 14 in the vicinity to where the balancing device 41 is connected to the cold conduit 14. According to this embodiment the pressure difference determining device 46 is connected to a controller 48 of the thermal server plant 40. The local pressure difference, $\Delta p_{local}$, is determined either in the pressure difference determining device 46 or in the controller 48. The controller is configured to control the flow of heat transfer liquid through the regulator 42. Hence, upon the local pressure difference, $\Delta p_{local}$, is determined to be above the first differential pressure threshold, the controller 48 is configured to regulate the flow of heat transfer liquid from the hot conduit 12 to the cold conduit 14. Moreover, upon the local pressure difference, $\Delta p_{local}$, is determined to be below the second differential pressure threshold, the controller 48 is configured to regulate the flow of heat transfer liquid from the cold conduit 14 to the hot conduit 12. According to this embodiment the regulator 42 may be embodied as a control valve controlled by the controller 48.

The controller 48 may further be connected to the heat exchanger 44. Hence, upon the local pressure difference, $\Delta p_{local}$, is determined to be above the first differential pressure threshold, the controller 48 may control the heat exchanger 44 such that the heat transfer liquid flowing through the balancing device 41 is cooled. Moreover, upon the local pressure difference, $\Delta p_{local}$, is determined to be below the second differential pressure threshold, the controller 48 may control the heat exchanger 44 such that the heat transfer liquid flowing through the balancing device 41 is heated.

The heat exchanger 44 may be configured to extract and/or deposit thermal energy from/to a thermal energy accumulator 50. This is illustrated in FIG. 3. Hence, the thermal server plant 40 may further comprise the thermal energy accumulator 50. The thermal energy accumulator 50 is external from the thermal energy circuit 10. The thermal energy accumulator 50 is a structure that can create sufficient thermal inertia to the system. According to non-limiting examples the thermal energy accumulator may be a man-made structure with high inertia, a ground storage, a water accumulator, a salt accumulator, a lake, the sea or the air.

The heat exchanger 44 is connected to the thermal energy accumulator 50. The heat exchanger 44 is configured to extract thermal energy from the thermal energy accumulator 50 upon heating of heat transfer liquid. The heat exchanger 44 is configured to deposit thermal energy to the thermal energy accumulator 50 upon cooling of heat transfer liquid.

Figure 4:
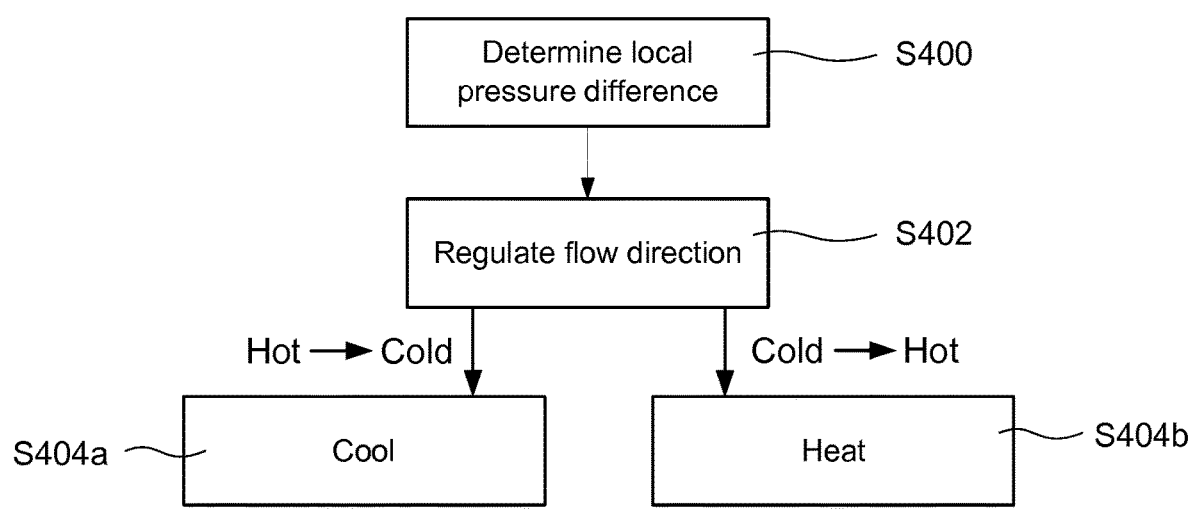
FIG. 4 is a block diagram of controlling a thermal server plant.

In connection with FIG. 4, a method for controlling thermal energy of the thermal energy circuit 10 will be discussed. The method comprises the following acts. Determining S400 a local pressure difference, $\Delta p_{local}$, between a hot conduit local pressure, $p_h$, of heat transfer liquid of the hot conduit 12 and a cold conduit local pressure, $p_c$, of heat transfer liquid of the cold conduit 14. Hence, the local pressure difference, $\Delta p_{local}$, being defined as $\Delta p_{local}=p_h-p_c$. Regulating S402, based on the local pressure difference, $\Delta p_{local}$, a flow direction of heat transfer liquid between the hot and cold conduits 12, 14. Thereby selectively allowing heat transfer liquid to flow from the hot conduit 12, via the regulator 42 and the heat exchanger 44, into the cold conduit 14 or allowing heat transfer liquid to flow from the cold conduit 14, via the regulator 42 and the heat exchanger 44, into the hot conduit 12. Upon heat transfer liquid is regulated to flow from the hot conduit 12 through the heat exchanger 44, cooling S404a the heat transfer liquid by the heat exchanger 44. Upon heat transfer liquid is regulated to flow from the cold conduit 14 through the heat exchanger 44 heating S404b the heat transfer liquid by the heat exchanger 44.

The act of regulating S402 may more precisely be performed according to the following: upon the local pressure difference, $\Delta p_{local}$, is determined to be above a first differential pressure threshold, regulating the flow direction of heat transfer liquid such that heat transfer liquid is flowing from the hot conduit 12, via the regulator 42 and the heat exchanger 44, into the cold conduit 14; or upon the local pressure difference, $\Delta p_{local}$, is determined to be below a second differential pressure threshold, regulating the flow direction of heat transfer liquid such that heat transfer liquid is flowing from the cold conduit 14, via the regulator 42 and the heat exchanger 44, into the hot conduit 12. Wherein the second differential pressure threshold is lower than or equal to the first differential pressure threshold.

The act of cooling S404a heat transfer liquid by the heat exchanger 44 may comprise cooling heat transfer liquid with a predetermined differential cooling temperature. The predetermined differential cooling temperature may be in the range of 5-16° C., preferably in the range of 7-12° C., more preferably 8-10° C. The act of heating S404b heat transfer liquid by the heat exchanger 44 may comprise heating heat transfer liquid with a predetermined differential heating temperature. The predetermined differential heating temperature may be in the range of 5-16° C., preferably in the range of 7-12° C., more preferably 8-10° C.

The act of cooling S404a heat transfer liquid by the heat exchanger 44 may comprises depositing thermal energy to the thermal energy accumulator 50. The act of heating S404b heat transfer liquid by the heat exchanger 44 may comprise extracting thermal energy from the thermal energy accumulator 50.

As mentioned above an effective and easy to handle thermal server plant to be connected to a thermal energy circuit 10 comprising a hot conduit 12 configured to allow heat transfer liquid of a first temperature to flow therethrough, and a cold conduit 14 configured to allow heat transfer liquid of a second temperature to flow therethrough, is provided. The thermal server 40 plant comprises a balancing device 41 arranged to be connected to the hot conduit 12 and to the cold conduit 14 for selectively allowing heat transfer liquid to flow from the hot conduit 12, the regulator 42 and a heat exchanger 44, into the cold conduit 14 or allowing heat transfer liquid to flow from the cold conduit 14, via the regulator 42 and the heat exchanger 44, into the hot conduit 12. The flow direction is determined by a pressure difference between the hot and cold conduits 12, 14. The heat exchanger 44 is configured to alter the temperature of the heat transfer liquid flowing through the balancing device 41 by selectively cool heat transfer liquid from the hot conduit or heat heat transfer liquid from the cold conduit.

The person skilled in the art realizes that the present invention by no means is limited to the preferred embodiments described above. On the contrary, many modifications and variations are possible within the scope of the appended claims.

The connection of the balancing unit 41 to the hot and cold conduits 12, 14 may be made via service valves 41a, 41b. The service valves 41a, 41b may be used for connecting and disconnecting the balancing device 41 to/from the thermal energy circuit 10.

The heat exchanger 44 may be connected to a cooling machine. Hence, the heat exchanger 44 may, in addition to or in place of the accumulator 50, use the cooling machine for cooling heat transfer liquid from the hot conduit 12 flowing through the heat exchanger 44 into the cold conduit 14.

The heat exchanger 44 may be connected to a heat pump. Hence, the heat exchanger 44 may, in addition to or in place of the accumulator 50, use the heat pump for heating heat transfer liquid from the cold conduit 14 flowing through the heat exchanger 44 into the hot conduit 12.

Additionally, variations to the disclosed embodiments can be understood and effected by the skilled person in practicing the claimed invention, from a study of the drawings, the disclosure, and the appended claims.

The invention claimed is:

1. A thermal server plant arranged to be connected to a thermal energy circuit comprising a hot conduit configured to allow heat transfer liquid of a first temperature to flow therethrough, and a cold conduit configured to allow heat transfer liquid of a second temperature to flow therethrough, the second temperature is lower than the first temperature, the thermal server plant comprising:

a balancing device including a regulator and a heat exchanger, wherein the balancing device is arranged to be connected to the hot conduit and to the cold conduit for either allowing heat transfer liquid to flow from the hot conduit, via the regulator and the heat exchanger of the balancing device, into the cold conduit or allowing heat transfer liquid to flow from the cold conduit, via the regulator and the heat exchanger, into the hot conduit, wherein the regulator is configured to regulate the flow of heat transfer liquid between the hot and cold conduits through the balancing device, and the heat exchanger is configured to alter the temperature of the heat transfer liquid flowing through the balancing device by either cooling heat transfer liquid from the hot conduit or heating heat transfer liquid from the cold conduit;

a pressure difference determining device configured to determine a local pressure difference, $\Delta p_{local}$, between a hot conduit local pressure, $p_h$, of heat transfer liquid of the hot conduit and a cold conduit local pressure, $p_c$, of heat transfer liquid of the cold conduit, $\Delta p_{local}=p_h-p_c$, wherein the regulator is configured to in a case that the local pressure difference, $\Delta p_{local}$, is determined to be above a first differential pressure threshold, regulate the flow of heat transfer liquid from the hot conduit to the cold conduit; or in a case that the local pressure difference, $\Delta p_{local}$, is determined to be below a second differential pressure threshold, regulate the flow of heat transfer liquid from the cold conduit to the hot conduit, wherein the second differential pressure threshold is lower than or equal to the first differential pressure threshold.

2. The thermal server plant according to claim 1, wherein the heat exchanger is configured to cool heat transfer liquid from the hot conduit with a predetermined differential cooling temperature or to heat transfer liquid from the cold conduit with a predetermined differential heating temperature.

3. The thermal server plant according to claim 1, wherein the temperature difference between the first and second temperatures is in the range of 5-16° C.

4. The thermal server plant according to claim 2, wherein the predetermined differential cooling temperature is in the range of 5-16° C., and wherein the predetermined differential heating temperature is within the range of 5-16° C.

5. The thermal server plant according to claim 1, wherein the pressure difference determining device comprises a hot conduit pressure determining unit and a cold conduit pressure determining unit, wherein the hot conduit pressure determining unit is arranged to be connected to the hot conduit for measuring the hot conduit local pressure, and wherein the cold conduit pressure determining unit is arranged to be connected to the cold conduit for measuring the cold conduit local pressure.

6. The thermal server plant according to claim 5, wherein the hot conduit pressure determining unit is connected to the hot conduit in the vicinity to where the balancing device is connected to the hot conduit, and wherein the cold conduit pressure determining unit is connected to the cold conduit in the vicinity to where the balancing device is connected to the cold conduit.

7. The thermal server plant according to claim 5, further comprising a controller connected to the pressure difference determining device and the heat exchanger, wherein the controller is configured to:

in the case that the local pressure difference, $\Delta p_{local}$, is determined to be above the first differential pressure threshold, control the heat exchanger such that the heat transfer liquid flowing through the balancing device is cooled; or in case that the local pressure difference, $\Delta p_{local}$, is determined to be below the second differential pressure threshold, control the heat exchanger such that the heat transfer liquid flowing through the balancing device is heated.

8. The thermal server plant according to claim 7, wherein the controller is further connected to the regulator for controlling the regulator.

9. The thermal server plant according to claim 1, further comprising a thermal energy accumulator external from the thermal energy circuit, wherein the heat exchanger is connected to the thermal energy accumulator, wherein the heat exchanger is configured to extract thermal energy from the thermal energy accumulator upon heating of heat transfer liquid, and wherein the heat exchanger is configured to deposit thermal energy to the thermal energy accumulator upon cooling of heat transfer liquid.

10. A method for controlling thermal energy of a thermal energy circuit comprising a hot conduit configured to allow heat transfer liquid of a first temperature to flow therethrough, and a cold conduit configured to allow heat transfer liquid of a second temperature to flow therethrough, the second temperature is lower than the first temperature, the method comprising:

determining a local pressure difference, $\Delta p_{local}$, between a hot conduit local pressure, $p_h$, of heat transfer liquid of the hot conduit and a cold conduit local pressure, $p_c$, of heat transfer liquid of the cold conduit, $\Delta p_{local} = p_h - p_c$;

regulating, based on the local pressure difference, a flow direction of heat transfer liquid between the hot and cold conduits, thereby selectively allowing either heat transfer liquid to flow from the hot conduit, via a regulator and a heat exchanger, into the cold conduit or allowing heat transfer liquid to flow from the cold conduit, via the regulator and the heat exchanger, into the hot conduit;

in a case that heat transfer liquid is regulated to flow from the hot conduit through the heat exchanger, cooling the heat transfer liquid by the heat exchanger;

in a case that heat transfer liquid is regulated to flow from the cold conduit through the heat exchanger heating the heat transfer liquid by the heat exchanger;

in a case that the local pressure difference, $\Delta p_{local}$, is determined to be above a first differential pressure threshold, regulating the flow direction of heat transfer liquid such that heat transfer liquid is flowing from the hot conduit, via the regulator and the heat exchanger, into the cold conduit; or in a case that the local pressure difference, $\Delta p_{local}$, is determined to be below a second differential pressure threshold, regulating the flow direction of heat transfer liquid such that heat transfer liquid is flowing from the cold conduit, via the regulator and the heat exchanger, into the hot conduit, wherein the second differential pressure threshold is lower than or equal to the first differential pressure threshold.

11. The method of claim 10, wherein the act of cooling heat transfer liquid by the heat exchanger comprises cooling heat transfer liquid with a predetermined differential cooling temperature, wherein the predetermined differential cooling temperature is in the range of 5-16° C., and wherein the act of heating heat transfer liquid by the heat exchanger comprises heating heat transfer liquid with a predetermined differential heating temperature, wherein the predetermined differential heating temperature is in the range of 5-16° C.

12. The method of claim 10, wherein the act of cooling heat transfer liquid by the heat exchanger comprises depositing thermal energy to a thermal energy accumulator, and wherein the act of heating heat transfer liquid by the heat exchanger comprises extracting thermal energy from the thermal energy accumulator.

13. A thermal server plant arranged to be connected to a thermal energy circuit comprising a hot conduit configured to allow liquid of a first temperature to flow therethrough, and a cold conduit configured to allow liquid of a second temperature to flow therethrough, the second temperature being lower than the first temperature, the thermal server plant comprising:

a balancing device including
a heat exchanger configured to alter a temperature of liquid flowing through the balancing device by either cooling heat transfer liquid from the hot conduit or heating liquid from the cold conduit; and
a regulator configured to regulate a flow of liquid between the hot conduit and the cold conduit through the balancing device, wherein the balancing device is configured to be connected to the hot conduit and the cold conduit and selectively either: allow liquid to flow from the hot conduit into the cold conduit via the regulator and heat exchanger; or allow liquid to flow from the cold conduit to the hot conduit via the regulator and heat exchanger;

a differential pressure regulator configured to determine a local pressure difference, $\Delta p_{local}$, between a hot conduit local pressure, $p_h$, of liquid of the hot conduit and a cold conduit local pressure, $p_c$, of liquid of the cold conduit, $\Delta p_{local} = p_h - p_c$, wherein the regulator is configured to, based on the local pressure difference, regulate flow of heat transfer liquid between the hot and cold conduits; and a controller connected to the differential pressure regulator and the heat exchanger, wherein the controller is configured to in a case that the local pressure difference, $\Delta p_{local}$, is determined to be above the first differential pressure threshold, control the heat exchanger such that the heat transfer liquid flowing through the balancing device is cooled; or in a case that the local pressure difference, $\Delta p_{local}$, is determined to be below the second differential pressure threshold, control the heat exchanger such that the heat transfer liquid flowing through the balancing device is heated.

14. The thermal server plant of claim 13, wherein the differential pressure regulator is integrated into the regulator.

15. The thermal server plant of claim 13, wherein the differential pressure regulator includes a hot conduit pressure determining unit and a cold conduit pressure determining unit, wherein the hot conduit pressure determining unit is arranged to be connected to the hot conduit for measuring the hot conduit local pressure, and wherein the cold conduit pressure determining unit is arranged to be connected to the cold conduit for measuring the cold conduit local pressure.

16. The thermal server plant of claim 13, wherein the controller is configured to control operation of the regulator.

17. The thermal server plant of claim 13, wherein the balancing device does not allow for the liquid to simultaneously flow from the hot conduit into the cold conduit and from the cold conduit to the hot conduit.

* * * * *